US011199138B2

(12) United States Patent
Garabello et al.

(10) Patent No.: US 11,199,138 B2
(45) Date of Patent: Dec. 14, 2021

(54) LOCKNUT SUN GEAR FOR GAS TURBINE ENGINE

(71) Applicant: GE Avio S.r.l., Rivalta di Turin (IT)

(72) Inventors: Marco Garabello, Turin (IT); Paolo Altamura, Monopoli (IT); Gian Mario Bragallini, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 163 days.

(21) Appl. No.: 16/482,024

(22) PCT Filed: Jan. 24, 2018

(86) PCT No.: PCT/EP2018/051737
§ 371 (c)(1),
(2) Date: Jul. 30, 2019

(87) PCT Pub. No.: WO2018/138154
PCT Pub. Date: Aug. 2, 2018

(65) Prior Publication Data
US 2019/0390604 A1    Dec. 26, 2019

(30) Foreign Application Priority Data
Jan. 30, 2017    (EP) .................................... 17425011

(51) Int. Cl.
*F02C 7/32*    (2006.01)
*F16C 19/26*    (2006.01)
(Continued)

(52) U.S. Cl.
CPC ............... *F02C 7/32* (2013.01); *F01D 5/026* (2013.01); *F02C 7/36* (2013.01); *F16C 19/26* (2013.01);
(Continued)

(58) Field of Classification Search
None
See application file for complete search history.

(56) References Cited

U.S. PATENT DOCUMENTS 4,159,888 A * 7/1979 Thompson .............. F01D 25/18
    415/105
4,456,425 A * 6/1984 McCarty .................. F02C 7/32
    403/356
(Continued)

FOREIGN PATENT DOCUMENTS

CN    101008349 A    8/2007
CN    104136721 A    11/2014
(Continued)

OTHER PUBLICATIONS

European Search Report Corresponding to EP174250118 dated Jul. 17, 2017.
PCT ISR Corresponding to PCT/EP2018/051737 dated Apr. 24, 2018.

*Primary Examiner* — Juan G Flores
(74) *Attorney, Agent, or Firm* — Venable LLP; Elizabeth C. G. Gitlin; Michele V. Frank

(57) ABSTRACT

A turbine engine defines an axial direction and a radial direction and includes a shaft assembly, a fan or propeller assembly, an engine core, a coupling shaft, a spacer, a sleeve, and a nut The coupling shaft defines an annular surface extended along the axial direction and a groove extended in a circumferential direction. The spacer defines a first portion disposed in the groove of the coupling shaft. The sleeve defines a threaded portion that extends along the axial direction and is disposed outward of the spacer in the radial direction. The nut defines a plurality of nut threads configured to mate with the plurality of sleeve threads of the
(Continued)

sleeve. The nut defines a radial portion adjacent to at least a portion of the sleeve and at least a portion of the spacer in the axial direction.

15 Claims, 7 Drawing Sheets

(51) Int. Cl.
  *F16C 33/58* (2006.01)
  *F16C 35/063* (2006.01)
  *F16D 1/06* (2006.01)
  *F01D 5/02* (2006.01)
  *F02C 7/36* (2006.01)

(52) U.S. Cl.
  CPC .......... *F16C 33/586* (2013.01); *F16C 35/063* (2013.01); *F16D 1/06* (2013.01); *F05D 2220/32* (2013.01); *F05D 2230/60* (2013.01); *F05D 2240/60* (2013.01); *F16C 2360/23* (2013.01)

(56) References Cited

U.S. PATENT DOCUMENTS

| | | | |
|---|---|---|---|
| 7,128,529 B2* | 10/2006 | Le Jeune | ................ F01D 5/025 |
| | | | 415/229 |
| 2005/0013696 A1 | 1/2005 | Le Jeune et al. | |
| 2008/0120839 A1 | 5/2008 | Schilling | |
| 2017/0191416 A1 | 7/2017 | Amano et al. | |
| 2018/0128322 A1* | 5/2018 | Etzold | .................... F16D 1/094 |

FOREIGN PATENT DOCUMENTS

| | | |
|---|---|---|
| RU | 2572744 C1 | 1/2016 |
| WO | WO2016/075984 A1 | 5/2016 |

* cited by examiner

LOCKNUT SUN GEAR FOR GAS TURBINE ENGINE

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter is generally related to fan or propeller gearbox assemblies of turbine engines.

BACKGROUND

Turbine engines generally include one or more rotatable shafts transferring power or torque within assemblies of the gas turbine engine. Such shafts may include one or more components to which energy is transferred, such as a gear or a bearing. In various existing arrangements of gears or bearings on rotatable shafts, excessive movement of the shaft in the forward or aft axial direction and/or radial direction may induce wear on the shaft, the one or more components connected to the shaft, or the one or more assemblies interfacing with the one or more components connected to the shaft.

Therefore, a need exists for a shaft assembly and/or method of arrangement of a shaft assembly that may provide bi-directional axial retention and radial retention while minimizing assembly forces to the shaft and interfacing assemblies.

BRIEF DESCRIPTION

Aspects and advantages of the invention will be set forth in part in the following description, or may be obvious from the description, or may be learned through practice of the invention.

The present disclosure is directed to a shaft assembly for a turbine engine, wherein the turbine engine defines an axial direction and a radial direction. The turbine engine includes a fan or propeller assembly and an engine core, and the fan or propeller assembly includes a gearbox. The shaft assembly includes a coupling shaft connected at a first end to the engine core and coupled at a second end to the gearbox, a spacer, a sleeve, and a nut. The coupling shaft defines an annular surface extended along the axial direction, in which the surface defines a groove extended in a circumferential direction. The spacer defines a first portion extended inward in the radial direction and a second portion extended in the axial direction, in which the first portion is disposed in the groove of the coupling shaft. The sleeve defines a threaded portion comprising a plurality of threads defined outwardly in the radial direction, in which the threaded portion extends along the axial direction, and the sleeve is disposed outward of the spacer in the radial direction. The nut defines a plurality of threads defined inwardly in the radial direction, in which the plurality of threads of the nut is configured to mate with the plurality of threads of the sleeve. The nut defines a radial portion extended inward in the radial direction, in which the radial portion is adjacent to at least a portion of the sleeve and at least a portion of the spacer in the axial direction.

In one example, the sleeve defines a star gear of the gearbox or a bearing assembly.

In another example, the coupling shaft, the spacer, the sleeve, and the nut are in adjacent arrangement along the radial direction.

In yet another example, a portion of the sleeve abuts the first portion of the spacer in the axial direction.

In still another example, the spacer further defines a split along a circumference of the spacer.

In still yet another example, the spacer defines one or more sections collectively forming a circumference of the spacer.

In one example, the spacer defines a first material, wherein the first material comprises an elastic material.

In various examples, the spacer defines a first material, the first material comprising a polymer matrix composite. In one example, the first material comprises a solid foamed synthetic polymer matrix. In another example, the solid foamed synthetic polymer matrix is a synthetic elastomer.

In still various examples, the spacer defines a first material in which the first material comprises a plurality of fabric sheets, wherein each fabric sheet comprises a network of fibers.

In one example, the shaft assembly further includes a lock washer disposed within a nut groove defined in the nut along the circumferential direction, in which the lock washer is disposed between the nut and the sleeve along the radial direction.

Another aspect of the present disclosure is directed to a method of retaining a threaded sleeve onto a shaft assembly, the shaft assembly including a rotatable shaft defining a groove extended in a circumferential direction, a spacer defining an axially extended first portion and a radially extended second portion, and a threaded nut. The method includes positioning the spacer in the groove of the shaft such that the radially extended second portion extends generally parallel to the shaft; positioning at least a portion of the threaded sleeve in radially adjacent arrangement to the radially extended second portion of the spacer; and affixing the threaded nut onto the threaded sleeve, wherein affixing the threaded nut onto the threaded sleeve positions the shaft, the spacer, the threaded sleeve, and the threaded nut in radially adjacent arrangement.

In one example of the method, affixing the threaded nut onto the threaded sleeve includes applying a desired amount of torque to the threaded nut, sleeve, and/or first component.

Yet another aspect of the present disclosure is directed to a turbine engine defining an axial direction and a radial direction. The turbine engine includes a fan or propeller assembly including a gearbox, an engine core including one or more rotors, and a shaft assembly. The shaft assembly includes a coupling shaft coupled at a first end to the engine core and coupled at a second end to the gearbox, in which the coupling shaft defines an annular surface extended along the axial direction, and wherein the surface defines a groove extended in a circumferential direction; a spacer defining a first portion extended inward in the radial direction and a second portion extended in the axial direction, in which the first portion is disposed in the groove of the coupling shaft; a sleeve defining a threaded portion including a plurality of threads defined outwardly in the radial direction, in which the threaded portion extends along the axial direction, and wherein the sleeve is disposed outward of the spacer in the radial direction; and a nut defining a plurality of threads defined inwardly in the radial direction, in which the plurality of threads of the nut is configured to mate with the plurality of threads of the sleeve, and wherein the nut defines a radial portion extended inward in the radial direction, and wherein the radial portion is adjacent to at least a portion of the sleeve and at least a portion of the spacer in the axial direction.

In various examples, the spacer further defines a split along a circumference of the spacer. In one example, the spacer defines a first material, the first material comprising an elastic material. In another example, the spacer defines a first material, wherein the first material comprises a polymer matrix composite. In yet another example, the spacer defines a first material comprising a solid foamed synthetic polymer matrix.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
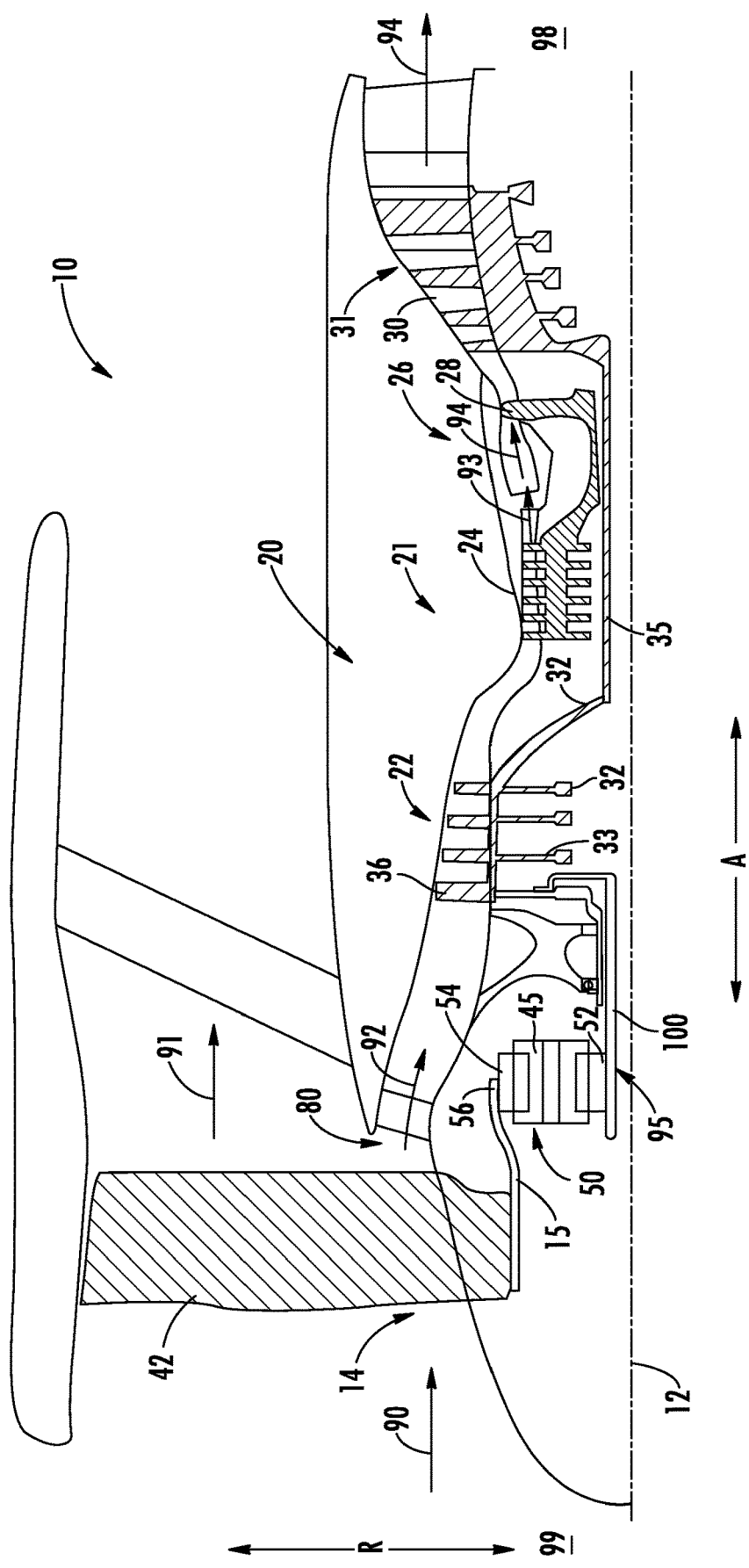
FIG. 1 is a schematic cross sectional view of an exemplary embodiment of a gas turbine engine arrangement according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Systems and methods of turbine engine coupling shaft assembly arrangements are generally provided that may provide bi-directional axial retention and radial retention while minimizing assembly forces to the shaft and interfacing assemblies. The combination of a shaft, a spacer, a sleeve, and a nut provided herein may provide bi-directional axial retention. Additionally, the aforementioned combination may provide radial support while distributing forces along the spacer in contrast to the shaft. Various embodiments of the spacer are provided that may improve radial support and/or retention of the shaft assembly.

Figure 2:
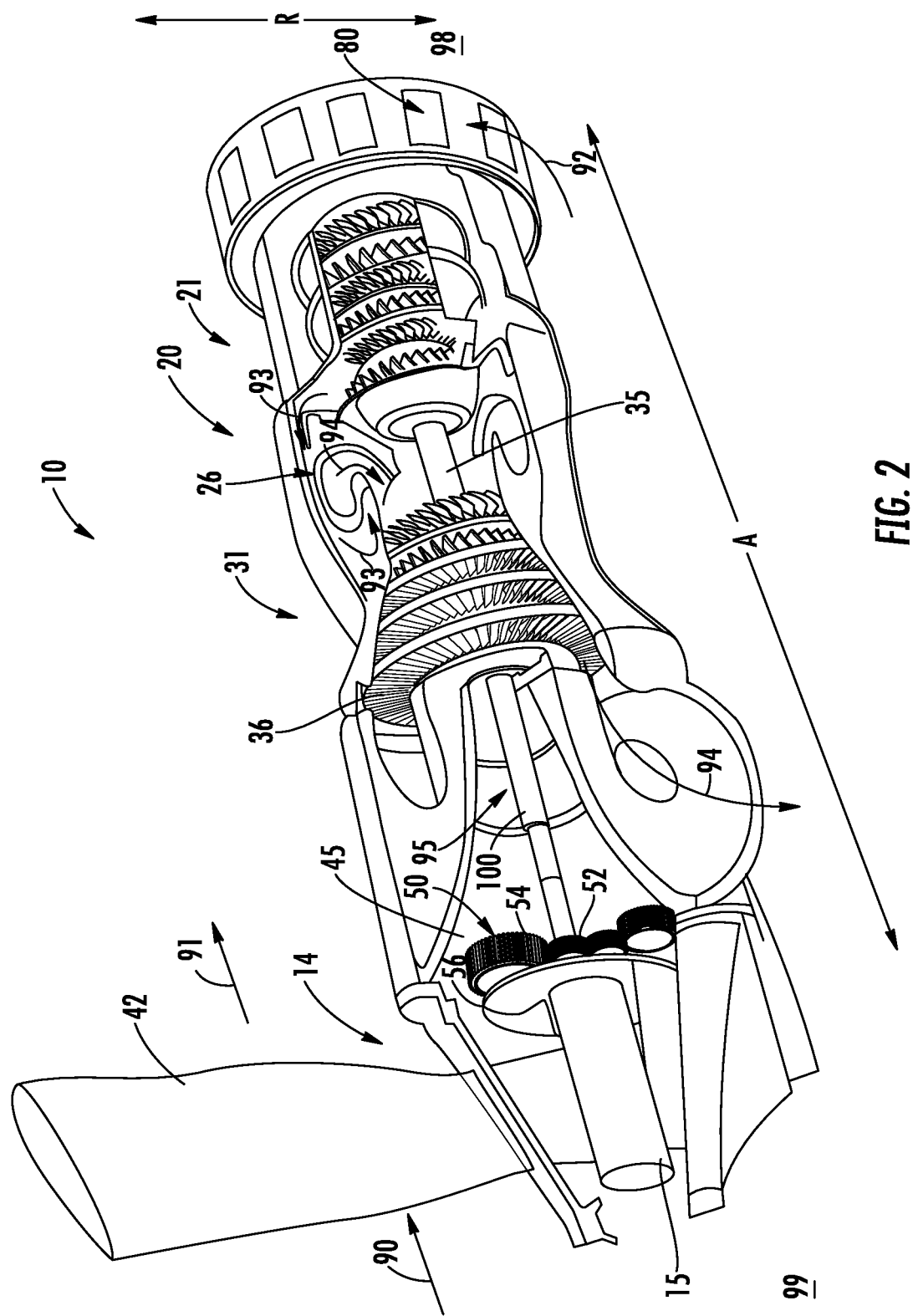
FIG. 2 is a schematic cross sectional view of another exemplary embodiment of a gas turbine engine arrangement according to an aspect of the present disclosure.

Referring now to the drawings, FIGS. 1 and 2 are each schematic cross sectional views of an exemplary turbine engine 10 (herein referred to as "engine 10"). In FIG. 1, the engine 10 is shown as a high bypass turbofan engine, incorporating an exemplary embodiment of a shaft assembly 95 according to an aspect of the present disclosure. In FIG. 2, the engine 10 is shown as a turboprop engine incorporating an exemplary embodiment of the shaft assembly 95 according to an aspect of the present disclosure. Although further described below with reference to a turbofan engine and/or a turboprop engine, the present disclosure is also applicable to wind turbines and turbomachinery in general, including propfan, turbojet, and turboshaft gas turbine engines, including marine and industrial turbine engines and auxiliary power units. As shown in FIGS. 1 and 2, the engine 10 has an axial centerline axis 12 that extends there through for reference purposes. The engine 10 defines an axial direction A, a radial direction R, and a forward end 99 and an aft end 98 along the axial direction A. In general, the engine 10 may include an engine core 20 and a fan or propeller assembly 14. The engine core 20 may generally include, in serial flow arrangement, a compressor section 21, a combustion section 26, and a turbine section 31. The compressor section 21 may define one or more compressors, such as a high pressure compressor (HPC) 24 and a low pressure compressor (LPC) 22. The turbine section 31 may define one or more turbines, such as a high pressure turbine (HPT) 28 and a low pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

Each of the compressors 22, 24 in the compressor section 21 and each of the turbines 28, 30 in the turbine section 31 may include one or more rotors 32. In one embodiment, the rotors 32 include one or more shafts 35 of the engine 10 connecting the compressor section 21 to the turbine section 31. In other embodiments, the rotors 32 generally define a disk 33 extended in the radial direction R and a plurality of airfoils 36 connected in circumferentially adjacent arrangement and extended outward in the radial direction R from the disk 33. In one embodiment, the one or more rotors 32 may each be connected together. For example, each rotor 32 of the turbine section 31 or the compressor section 21 may be connected by mechanical fasteners, such as bolts, nuts, screws, or rivets, or by a bonding process, such as welding, friction bonding, diffusion bonding, etc. In various embodiments, one or more compressors of the compressor section 21 may be drivingly connected and rotatable with one or more turbines of the turbine section 31 by way of the one or more shafts 35.

The fan or propeller assembly 14 generally includes a fan rotor 15. The fan rotor 15 includes a plurality of fan or propeller blades 42 that are coupled to and extend outwardly from the fan rotor 15 in the radial direction R. In the embodiments shown in FIGS. 1 and 2, the fan rotor 15 may extend in the axial direction A toward the forward end 99 from a reduction or power gearbox 45. The fan or propeller assembly 14 further includes the shaft assembly 95 coupled to the gearbox 45 and extended toward the aft end 98 and coupled to the engine core 20.

In one embodiment, the gearbox 45 may include a gear train 50 including a star gear 52 and a plurality of planet gears 54. The plurality of planet gears 54 may each be fixed such that each planet gear 54 rotates on a fixed axis relative to the star gear 52. An annular gear 56 surrounds the plurality of planet gears 54 and rotates and transfers power and torque from the star gear 52 through the plurality of planet gears 54. In the embodiments shown herein, the annular gear 56 may be coupled to or otherwise integral with the fan rotor 15. In one embodiment, the star gear 52 may be attached to, or integral to, the shaft assembly 95. In various embodiments, the gearbox 45 may further include additional planet gears disposed radially between the plurality of planet gears 54 and the star gear 52, or between the plurality of planet gears 54 and the annular gear 56.

Referring back to FIGS. 1 and 2, the shaft assembly 95 is connected to the engine core 20 to transmit torque and power through the star gear 52 to the gearbox 45 to the fan rotor 15. The fan rotor 15 may be connected to the surrounding annular gear 56 or the planet gears 54 to receive torque from the star gear 52 and transfer torque to drive the fan or propeller assembly 14. As power and torque are transmitted from the engine core 20, the gearbox 45 provides power and torque at an output speed to the fan rotor 15 more suitably adjusted for the fan or propeller assembly 14. For example, the gearbox 45 may reduce fan rotor 15 speed relative to the engine core 20 by a factor greater than one.

Figure 3:
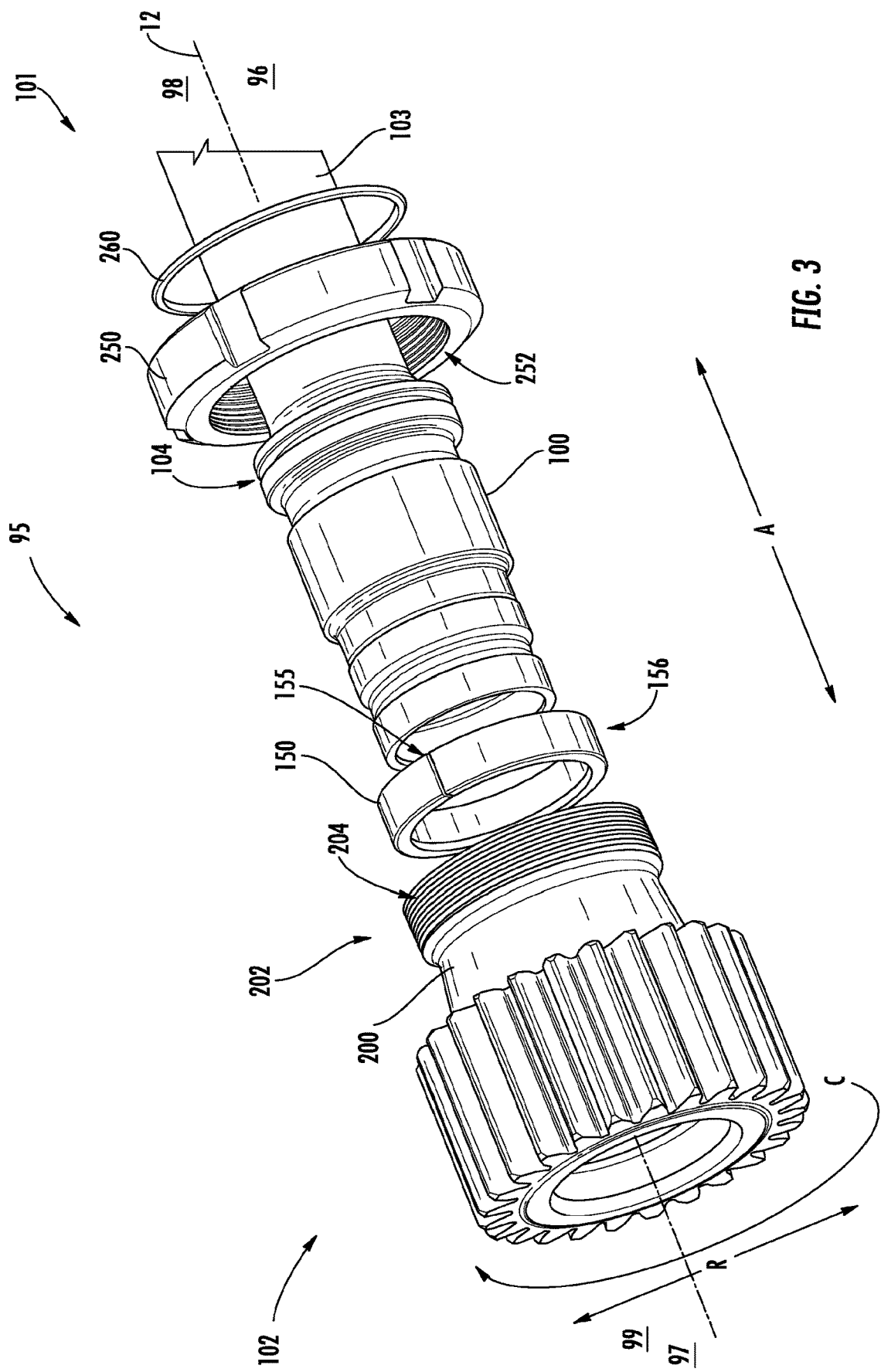
FIG. 3 is an exploded view of an exemplary embodiment of a coupling shaft assembly.

Referring now to FIG. 3, an exploded view of a shaft assembly 95 is shown. The shaft assembly 95 includes a coupling shaft 100, a spacer 150, a sleeve 200, and a nut 250. The coupling shaft 100 may define a first end 101 proximate to the engine core 20 and a second end 102 proximate to the gearbox 45. The coupling shaft 100 is connected at the first end 101 to the engine core 20, such as one or more rotors 32 of the engine core 20. The shaft assembly 95 is connected at the second end 102 to the gearbox 45, such as coupled, mated, or meshed with a spline interface 46 of the gearbox 45. In various embodiments, the spline interface 46 is defined by the plurality of planet gears 54 of the gearbox 45. The coupling shaft 100 further defines an annular surface 103 extended along the axial direction A. The annular surface 103 defines a groove 104 extended in a circumferential direction C, such as along a shaft outer diameter 105 defined by the annular surface 103. In various embodiments, the groove 104 is disposed toward the second end 102 of the coupling shaft 100 proximate to the gearbox 45.

Figure 4:
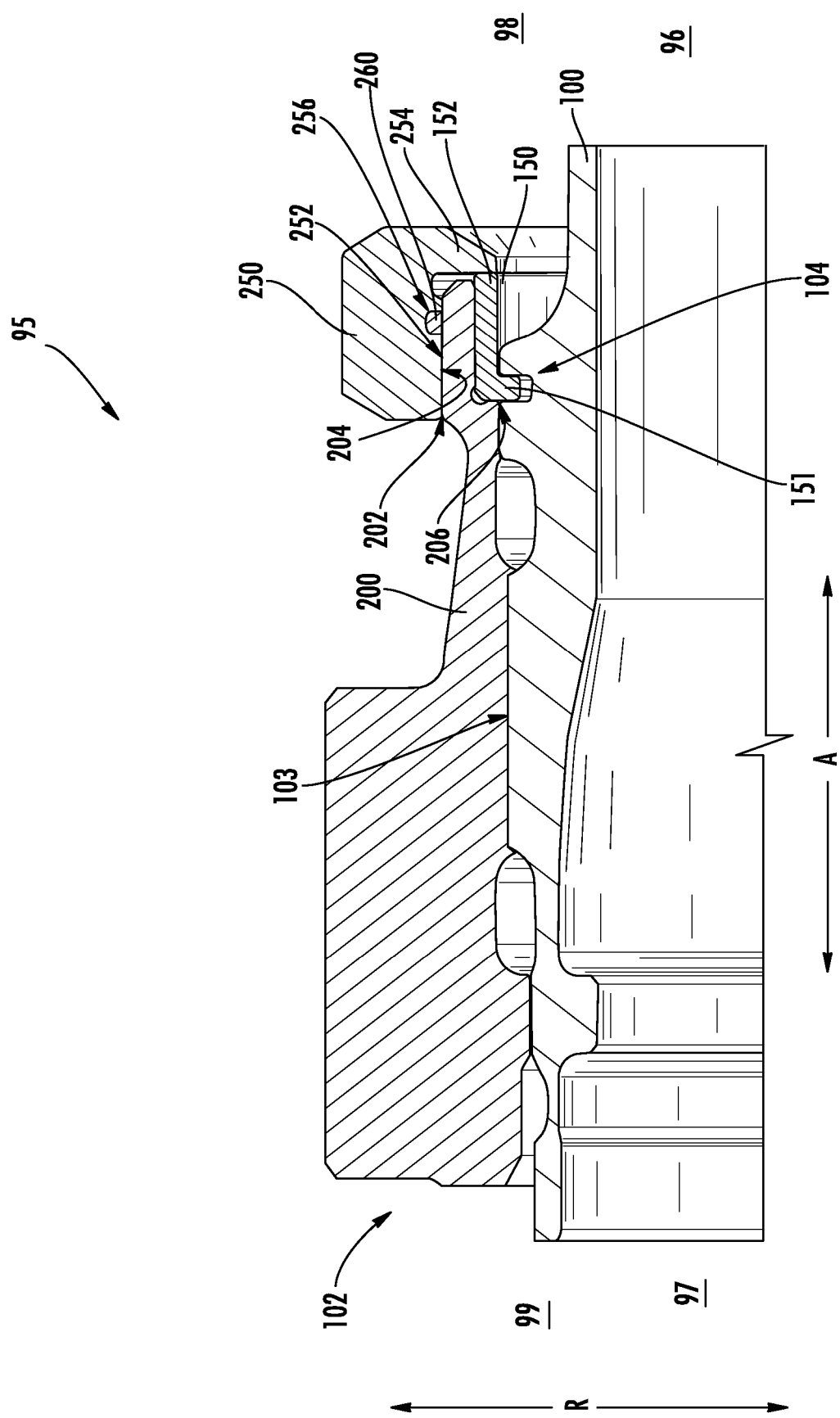
FIG. 4 is a schematic cross sectional view of the exemplary embodiment of a coupling shaft assembly.
Figure 5:
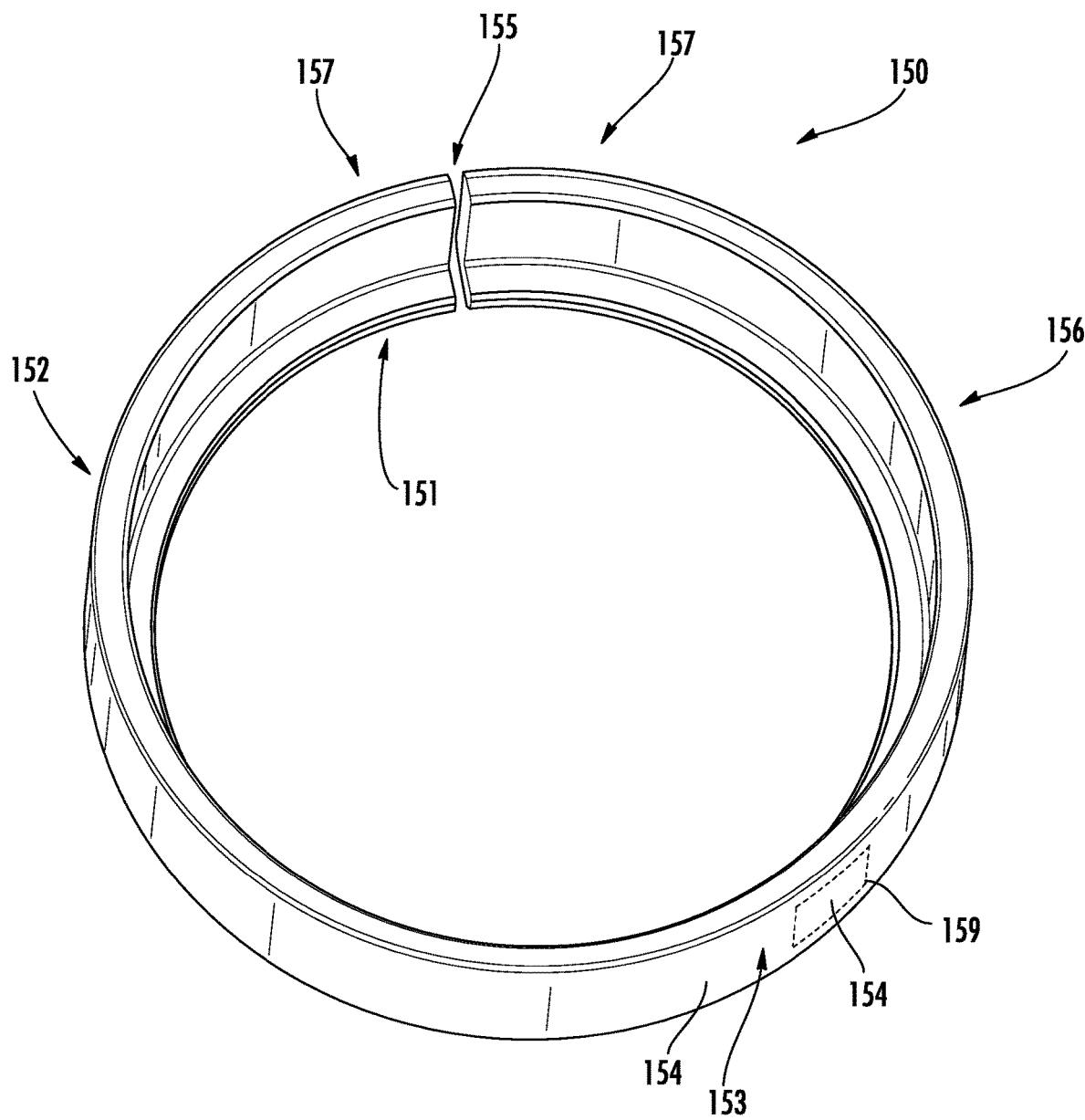
FIG. 5 is a perspective view of an exemplary embodiment of a spacer of the coupling shaft assembly.

Referring now to FIG. 4, an axial cross sectional view of the shaft assembly 95 is generally provided. Referring to FIG. 5, a perspective view of the spacer 150 of the shaft assembly 95 is generally provided. Referring now to FIGS. 3-5, the spacer 150 defines a first portion 151 extended inward in the radial direction R and a second portion 152 extended in the axial direction A. The first portion 151 is disposed in the groove 104 of the coupling shaft 100. As shown in FIG. 5, the spacer 150 may further define one or more splits 155 along a circumference 156 of the spacer 150. In one embodiment, as shown in FIG. 5, the spacer 150 defines one split 155 such that the spacer 150 may flex, bend, or otherwise translate outwardly along the radial direction R. In other embodiments, the spacer 150 defines a plurality of splits 155 such that the spacer 150 may include a plurality of sections 157 joined together to collectively form the circumference 156 placed into the groove 104 of the coupling shaft 100.

Referring back to FIGS. 3 and 4, the sleeve 200 extends along the axial direction A adjacent to the coupling shaft 100. The sleeve 200 defines a threaded portion 202 including a plurality of sleeve threads 204 defined outwardly in the radial direction R. The threaded portion 202 extends along the axial direction A. Referring to FIG. 4, the sleeve 200 is disposed outward of the spacer 150 in the radial direction R. In various embodiments, the sleeve 200 defines the star gear 52 of the gearbox assembly 45.

Referring still to FIGS. 3 and 4, the nut 250 defines a plurality of nut threads 252 defined inwardly in the radial direction R such that the plurality of nut threads 252 may mate or thread into the plurality of sleeve threads 204. The plurality of threads 204, 252 may define a coarse thread or a fine thread. The nut 250 further defines a radial portion 254 extended inward in the radial direction R. The radial portion 254 is adjacent to at least a portion of the sleeve 200 and at least a portion of the spacer 150 in the axial direction A. In various embodiments, the nut 250 may further define a nut groove 256 along the circumferential direction C, into which a lock washer 260 may be disposed between the nut 250 and the sleeve 200 in the radial direction R. The lock washer 260 may further aid retention of the nut 250 to the sleeve 200.

Referring to FIGS. 3 and 4, the shaft assembly 95 may define the coupling shaft 100, the spacer 150, the sleeve 200, and the nut 250 in adjacent arrangement in the radial direction R. The shaft assembly 95 may further define the first portion 151 of the spacer 150 toward a first end 97 of the shaft assembly 95 (e.g. the forward end 99) and the radial portion 254 of the nut 250 toward a second end 96 of the shaft assembly 95 (e.g. the aft end 98). The aforementioned arrangements may altogether provide retention of the sleeve 200 along the axial direction A toward the forward end 99 and the aft end 98. For example, as shown in FIG. 4, the nut 250 mated to the sleeve 200 via the plurality of threads 204, 252, in addition to the radial portion 254 of the nut 250, limits movement along the axial direction A toward the first end 97. As shown in FIG. 4, the sleeve 200, or a portion 206 thereof, abuts the first portion 151 of the spacer 150 in the axial direction A to limit movement along the axial direction A toward the second end 96. Additionally, the aforementioned combination may enable the sleeve 200 to be retained with relatively large forces onto the spacer 150 while applying relatively small forces onto the coupling shaft 100.

Referring now to FIG. 5, the spacer 150 may further define a surface 153 including a first material. In various embodiments, the first material includes an elastic material. In one embodiment, the elastic material may include metals or composites defining generally elastic properties. In other embodiments, the first material may include a composite 154 applied onto or within the surface 153 of the spacer 150. In one embodiment, the composite 154 is a polymer matrix composite.

In one embodiment, the composite 154 can be attached in several ways onto the surface 153 of the spacer 150, including any combination of the following: mechanical fastening of the composite 154 to the surface 153, adhesive bonding of the composite 154 to the spacer 150, etc.

In another embodiment, the composite 154 may be applied within 159 the surface 153 of the spacer 150. In various embodiments, the composite 154 may be formed from a solid foamed synthetic polymer. In one embodiment, the solid foamed synthetic polymer may include a synthetic elastomer, such as an elastomeric polyurethane. In another embodiment, the solid foamed synthetic polymer may include an ethylene vinyl acetate and/or an olefin polymer.

In yet another embodiment, the composite 154 is formed from a plurality of fabric sheets formed from a plurality of fibers. In each sheet, the plurality of fibers may form a network of fibers (e.g., a woven network, a random or parallel nonwoven network, or another orientation). In particular, the composite 154 may be constructed from high strength and high modulus fibers, such as para-aramid synthetic fibers (e.g., KEVLAR fibers available from E.I. duPont de Nemours and Company), metal fibers, ceramic fibers, glass fibers, carbon fibers, boron fibers, p-phenylenetherephtalamide fibers, aromatic polyamide fibers, silicon carbide fibers, graphite fibers, nylon fibers, or mixtures thereof. Another example of suitable fibers includes ultra-high molecular weight polyethylene (e.g., SPECTRA fibers manufactured by Honeywell International Inc.).

The fibers of the composite 154 may have high tensile strength and high modulus that are highly oriented, thereby resulting in very smooth fiber surfaces exhibiting a low coefficient of friction. Such fibers, when formed into a fabric layer, generally exhibit poor energy transfer to neighboring fibers during intermittent transfers of energy or torque from the engine core 20 to the gearbox 45.

The various embodiments of the spacer 150, in combination with the shaft assembly 95 as shown and described herein, may together enable axial and radial retention of the sleeve 200, or particularly the star gear 52, while limiting forces applied or transferred to the coupling shaft 100. Limited application or transfer of forces between the coupling shaft 100 and the combination of the spacer 150, sleeve 200, and nut 250 may further limit undesired transfers of energy from the engine core 20 to the fan or propeller assembly 14 (or, alternatively, from the fan or propeller assembly 14 to the engine core 20). Such limitation of energy transfer may provide benefits for intermittent changes of fluctuations in torque or power output from the engine core 20, overtorque events, unbalance at the fan or propeller assembly 14 or the engine core 20, or foreign object impacts, such as bird strikes, onto the fan or propeller assembly 14.

Figure 7:
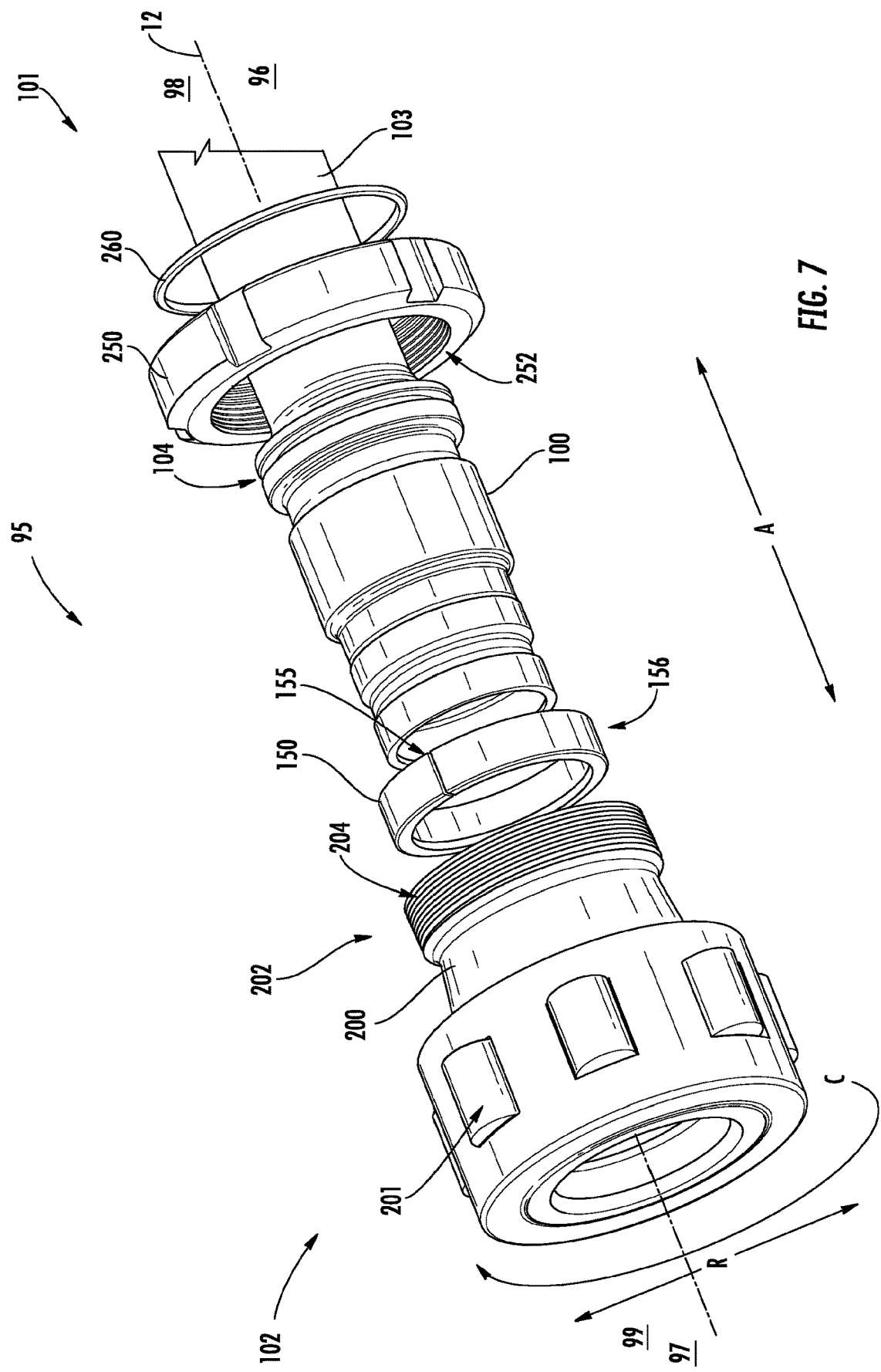
FIG. 7 is an exploded view of another exemplary embodiment of a coupling shaft assembly.

Referring now to an exemplary embodiment of the shaft assembly 95 shown in FIG. 7, the sleeve 200 may further define a surface extended along the axial direction A onto which a bearing assembly 201 is applied. The shaft assembly 95 shown in FIG. 7 may be configured substantially similarly as those shown and described in regard to FIGS. 1-5. In various embodiments, the sleeve 200 and the bearing assembly 201 may be at least partially integrally formed such that the sleeve 200 and the bearing assembly 201 together install onto the coupling shaft 100. In the embodiment shown in FIG. 7, the bearing assembly 201 defines a roller bearing. In other embodiments, the bearing assembly 201 may define a tapered roller bearing, a ball bearing, a thrust bearing, or a needle roller bearing, or other types and/or combinations of bearing or bearing orientation. In yet another embodiment, the sleeve 200 and/or the bearing assembly 201 may define a journal or liner of a journal bearing assembly.

The shaft assembly 95, including parts, components, or assemblies thereof and of the engine 10 shown and described in regard to FIGS. 1-5 may be formed of metals appropriate for gas turbine engines including, but not limited to, iron-based, titanium-based, nickel-based, or cobalt-based alloys, each of which may include chromium, cobalt, tungsten, tantalum, molybdenum, and/or rhenium. The coupling shaft 100 may be formed using casting, forging, machining, or combinations thereof. Additionally, or alternatively, the shaft assembly 95, or parts and components thereof, may be formed as a single unitary structure or an assembly of several components joined by one or more mechanical fasteners or joining processes, or combinations thereof. In various embodiments, the shaft assembly 95, or parts and components thereof, may be formed of composite materials, such as polymer matrix composites, ceramic matrix composites, or metal matrix composites.

During operation of the engine 10, as shown and described in regard to FIGS. 1-5 collectively, a volume of air as indicated schematically by arrows 90 enters the engine 10. As the air 90 passes across the fan or propeller blades 42, a portion of the air as indicated schematically by arrows 91 is directed or routed outside of the engine core 20 to provide propulsion. Additionally, another portion of air as indicated schematically by arrows 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and support operation of respectively coupled rotary members in the compressor section 21 and/or fan or propeller assembly 14. For example, the HPC 24 and the HPT 28 may be coupled and rotatable to drive the engine 10 and generate combustion gases 94 at the combustion section 26 to drive the LPT 30. The LPT 30 may be connected to the LPC 22. Referring to FIG. 1, the coupling shaft 100 may be attached to the LPC 22 at the first end 101 and to the gearbox 45 at the second end 102. In other embodiments the flexible coupling 100 shaft may be attached to the HPC 24 at the first end 101. Referring to FIG. 2, the coupling shaft 100 may be attached to the LPT 30 at the first end 101 and to the gearbox 45 at the second end 102. In other embodiments the coupling shaft 100 may be attached to the HPT 28 at the first end 101. The gearbox 45 may reduce the rotational speed from the engine core 20 (e.g. the compressor section 21 or the turbine section 31) and provide a desired amount of torque and rotational speed to the fan or propeller assembly 14.

Figure 6:
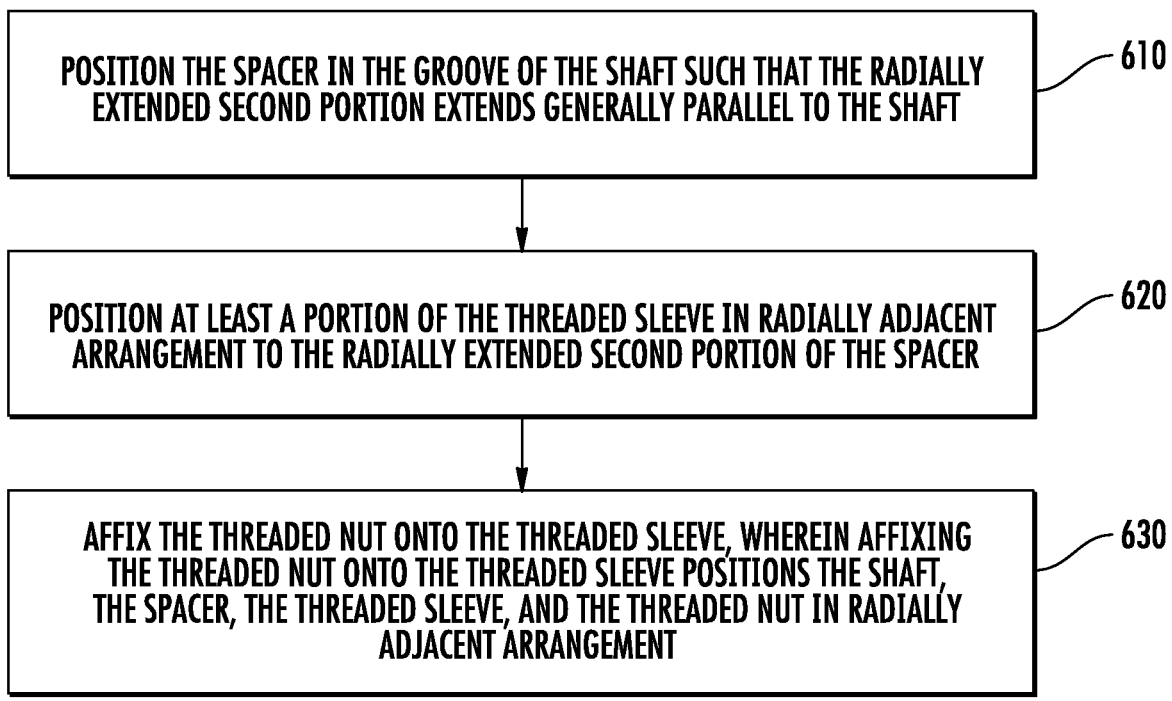
FIG. 6 is a flowchart outlining steps of a method of arranging a shaft assembly of a gas turbine engine.

Referring now to FIG. 6, a flowchart outlining an exemplary method of retaining a threaded sleeve onto a shaft assembly of a gas turbine engine (herein referred to as "method 600"). The shaft assembly includes a rotatable shaft that defines a groove extended in the circumferential direction C, a spacer defining an axially extended first portion and a radially extended second portion, and a threaded nut. In various embodiments, the shaft assembly may include the shaft assembly 95 shown and described in regard to FIGS. 1-5. For example, the shaft may include the coupling shaft 100 and the groove 104, the spacer 150 and the first portion 151 and second portion 152, the sleeve 200 including the plurality of sleeve threads 204, and the nut 250 including the plurality of nut threads 252. The method 600 may arrange a shaft assembly of a gas turbine engine to provide axial retention along a first and second direction (e.g. toward the forward end 99 and the aft end 98). Additionally, the method 600 may arrange a shaft assembly of a gas turbine engine to provide radial retention (e.g. along radial direction R) such that a relatively large amount of force is applied to a first component (e.g. the spacer 150 shown in FIGS. 1-5) in contrast to the shaft (e.g. the coupling shaft 100). FIG. 6 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 600 may include at (610) positioning the spacer in the groove of the shaft such that the radially extended second portion extends generally parallel to the shaft, at (620) positioning at least a portion of the threaded sleeve in radially adjacent arrangement to the radially extended second portion of the spacer, and at (630) affixing the threaded nut onto the threaded sleeve, wherein affixing the threaded nut onto the threaded sleeve positions the shaft, the spacer, the threaded sleeve, and the threaded nut in radially adjacent arrangement.

In one embodiment of the step at (630), affixing the threaded nut onto the threaded sleeve includes applying a desired amount of torque to the threaded nut, the threaded sleeve, and/or the spacer. In another embodiment, affixing the threaded nut may include applying an amount of torque limited by the spacer, the threaded sleeve, and/or the threaded nut.

Various embodiments of the shaft assembly 95 and/or the method 600 may be applied to one or more shafts 35 of the engine 10 and/or the star gear 52 or one or more bearings on the one or more shafts 35. In various embodiments, the sleeve 200 may define the star gear 52 or one or more bearing assemblies attached to the shaft 35. The interfacing components, such as the spline interface 46 of the gearbox 45, may in other embodiments define a static structure such as an outer bearing journal or frame of a bearing compartment or gearbox.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A shaft assembly for a turbine engine, wherein the turbine engine defines an axial direction and a radial direction, wherein the turbine engine includes a fan or propeller assembly and an engine core, and further wherein the fan or propeller assembly includes a gearbox, the turbine engine comprising:
    a coupling shaft connected at a first end to the engine core and coupled at a second end to the gearbox, wherein the coupling shaft defines an annular surface extended along the axial direction, and wherein the annular surface defines a groove extended in a circumferential direction;
    a spacer, wherein the spacer defines a first portion extended inward in the radial direction and a second portion extended in the axial direction, and wherein the first portion is disposed in the groove of the coupling shaft;
    a sleeve, wherein the sleeve defines a threaded portion comprising a plurality of sleeve threads defined outwardly in the radial direction, wherein the threaded portion extends along the axial direction, and wherein the sleeve is disposed outward of the spacer in the radial direction; and
    a nut, wherein the nut defines a plurality of nut threads defined inwardly in the radial direction, and wherein the plurality of nut threads of the nut is configured to mate with the plurality of sleeve threads of the sleeve, and further wherein the nut defines a radial portion extended inward in the radial direction, and wherein the radial portion is adjacent to at least a portion of the sleeve and at least a portion of the spacer in the axial direction.

2. The shaft assembly of claim 1, wherein the sleeve defines a star gear of the gearbox.

3. The shaft assembly of claim 1, wherein the coupling shaft, the spacer, the sleeve, and the nut are in adjacent arrangement along the radial direction.

4. The shaft assembly of claim 1, wherein a portion of the sleeve abuts the first portion of the spacer in the axial direction.

5. The shaft assembly of claim 1, wherein the spacer further defines a split along a circumference of the spacer.

6. The shaft assembly of claim 1, wherein the spacer defines one or more sections collectively forming a circumference of the spacer.

7. The shaft assembly of claim 1, wherein the spacer defines a first material, wherein the first material comprises an elastic material.

8. The shaft assembly of claim 1, wherein the spacer defines a first material, the first material comprising a polymer matrix composite.

9. The shaft assembly of claim 8, wherein the first material comprises a solid foamed synthetic polymer matrix.

10. The shaft assembly of claim 9, wherein the solid foamed synthetic polymer matrix is a synthetic elastomer.

11. The shaft assembly of claim 1, wherein the spacer defines a first material, and wherein the first material comprises a plurality of fabric sheets, wherein each fabric sheet of the plurality of fabric sheets comprises a network of fibers.

12. The shaft assembly of claim 1, further comprising:
    a lock washer disposed within a nut groove defined in the nut along the circumferential direction, wherein the lock washer is disposed between the nut and the sleeve along the radial direction.

13. The shaft assembly of claim 1, wherein the sleeve defines a bearing assembly.

14. A method of retaining a threaded sleeve onto a shaft assembly, the shaft assembly comprising a rotatable shaft defining a groove extended in a circumferential direction, a spacer defining an axially extended first portion and a radially extended second portion, and a threaded nut, the method comprising:
    positioning the spacer in the groove of the rotatable shaft such that the radially extended second portion extends parallel to the rotatable shaft;
    positioning at least a portion of the threaded sleeve in radially adjacent arrangement to the radially extended second portion of the spacer; and
    affixing the threaded nut onto the threaded sleeve, wherein affixing the threaded nut onto the threaded sleeve positions the rotatable shaft, the spacer, the threaded sleeve, and the threaded nut in radially adjacent arrangement.

15. The method of claim 14, wherein affixing the threaded nut onto the threaded sleeve includes applying a desired amount of torque to the threaded nut, the threaded sleeve, and/or a first component.

\* \* \* \* \*